United States Patent
Kadyk et al.

(10) Patent No.: US 6,895,425 B1
(45) Date of Patent: May 17, 2005

(54) USING AN EXPERT PROXY SERVER AS AN AGENT FOR WIRELESS DEVICES

(75) Inventors: Donald J. Kadyk, Bothell, WA (US); Neil S. Fishman, Bothell, WA (US); Marc Seinfeld, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 09/684,053

(22) Filed: Oct. 6, 2000

(51) Int. Cl.[7] ............................................. G06F 15/16
(52) U.S. Cl. ...................... 709/203; 709/217; 709/219; 709/246
(58) Field of Search ........................ 709/203, 217–219, 709/246, 229; 715/513; 707/513

(56) References Cited

U.S. PATENT DOCUMENTS

| | | | | |
|---|---|---|---|---|
| 5,727,159 A | * | 3/1998 | Kikinis ........................ | 709/246 |
| 5,901,287 A | * | 5/1999 | Bull et al. .................... | 709/218 |
| 6,049,821 A | * | 4/2000 | Theriault et al. ............ | 709/203 |
| 6,119,165 A | * | 9/2000 | Li et al. ....................... | 709/229 |
| 6,253,326 B1 | * | 6/2001 | Lincke et al. ................ | 713/201 |
| 6,397,246 B1 | * | 5/2002 | Wolfe ........................... | 709/217 |
| 6,507,867 B1 | * | 1/2003 | Holland et al. .............. | 709/219 |
| 6,611,876 B1 | * | 8/2003 | Barrett et al. ................ | 709/246 |
| 6,654,786 B1 | * | 11/2003 | Fox et al. ..................... | 709/203 |
| 2001/0042081 A1 | * | 11/2001 | MacFarlane et al. ........ | 707/513 |
| 2002/0002603 A1 | * | 1/2002 | Vange .......................... | 709/219 |
| 2002/0062345 A1 | * | 5/2002 | Guedalia et al. ............ | 709/204 |
| 2003/0061307 A1 | * | 3/2003 | Daswani et al. ............ | 709/217 |

* cited by examiner

*Primary Examiner*—Wei-Tai Lin
(74) *Attorney, Agent, or Firm*—Workman Nydegger

(57) ABSTRACT

An expert proxy server is described that is coupled to a number of wireless devices through a wireless network, and to a number of server computer systems through an external network such as, for example, the Internet. The expert proxy server acts as an agent for a wireless device by providing a service for the wireless device. Specifically, the expert proxy server determines that a service is to be provided to the wireless device. Next, the expert proxy server identifies an application that provides the service and then communicates with the identified application that provides the service. The expert proxy server compiles the results of the communication with the application and then transmits the compilation to the wireless device over the wireless network. Thus, the relatively smaller bandwidth of the wireless network is preserved by transmitting a minimal amount of information over the wireless network while leaving more extensive communications to occur over higher bandwidth external networks. Also, since the extensive processing occurs at the expert proxy server rather than at the wireless device, the application on the wireless device may be simplified and smaller as compared to the supporting applications on the expert proxy server thereby preserving the limited memory and processing capability of the wireless device.

21 Claims, 3 Drawing Sheets

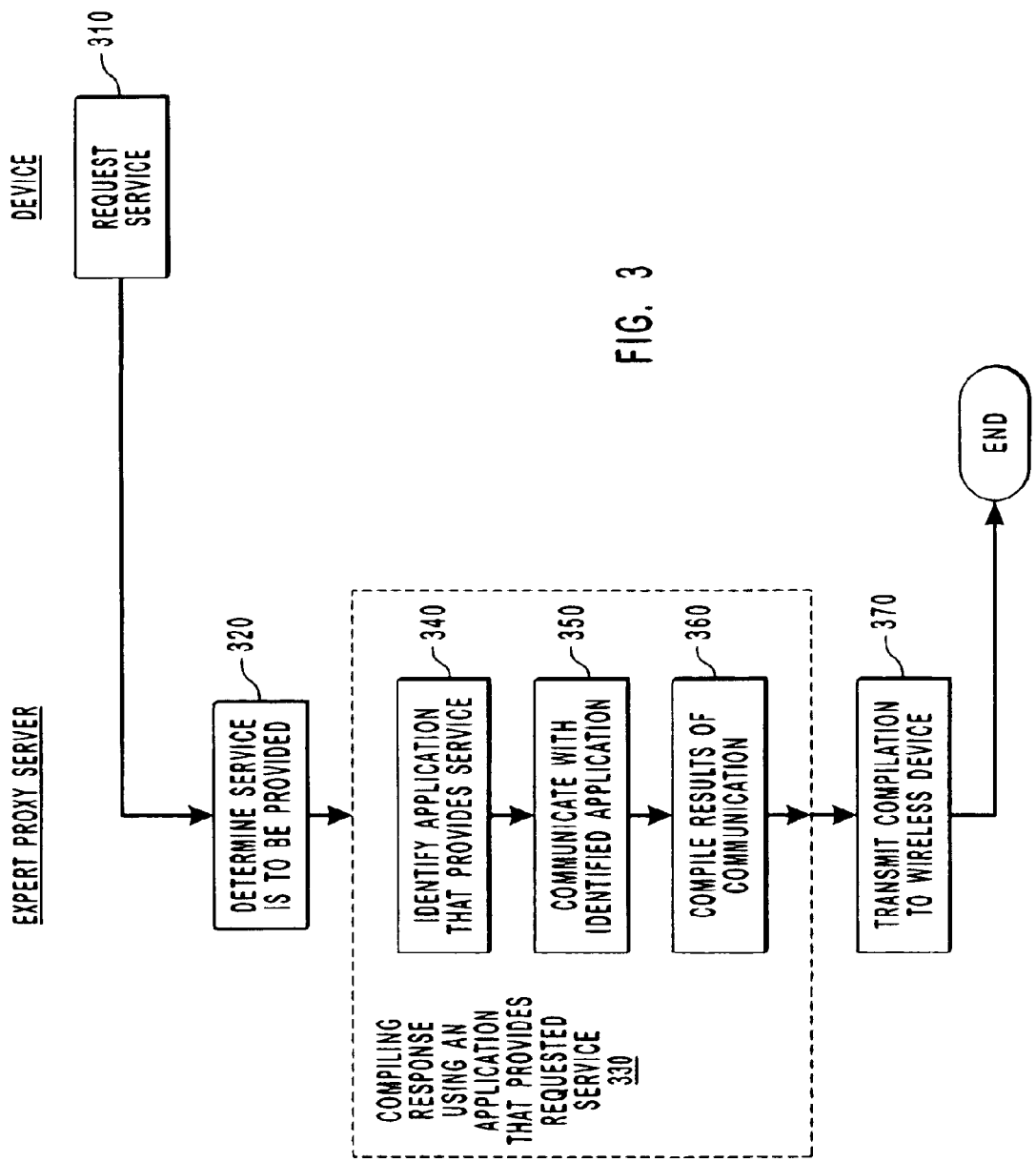

USING AN EXPERT PROXY SERVER AS AN AGENT FOR WIRELESS DEVICES

BACKGROUND OF THE INVENTION

1. The Field of the Invention

The present invention relates to computer networks. More particularly, the present invention relates to methods, systems and data structures for using an advanced proxy server computer system as an agent for a wireless device.

2. The Prior State of the Art

The Internet has transformed the way people communicate and obtain information. With minimal effort, anyone with access to an Internet ready computer system can send e-mail and access information throughout the world. Recently, the Internet has become available to many wireless devices thus increasing Internet accessibility even more.

Wireless devices are highly portable since they do not rely on a wired connection to a network and since they tend to be much smaller and lighter than desk-top personal computers. This portability is highly convenient in that it allows the wireless device to be easily carried, and allows the wireless device to be used wherever the user carries it.

However, the convenience of portability also comes with a cost. Specifically, wireless devices communicate over wireless networks which, in general, are slower than wired networks. Also, the wireless devices often have limited processing and memory capability due to their small size as compared to desk-top personal computers. Therefore, the wireless devices typically cannot perform the type of complex tasks that may be expected of more robust client devices. What is desired is a way of enabling wireless devices to provide more robust services even if the wireless device has limited processing and memory capability, and uses a slower wireless link.

SUMMARY OF THE INVENTION

The present invention does indeed enable wireless devices to provide more robust services even if the wireless device has limited processing, memory, and bandwidth capability. This may be accomplished by providing an expert proxy server computer system that acts as an agent on behalf of a wireless device.

The expert proxy server computer system is coupled to a number of wireless devices through a wireless network. The expert proxy server is also coupled to a number of server computer systems through an external network such as, for example, the Internet. The expert proxy server provides a service for the wireless device by offering a plurality of applications implemented on the proxy server and/or on the server computer systems on the external network.

In accordance with the present invention, the expert proxy server determines that a service is to be provided to a wireless device. This determination may be made in response to a request for the service to be provided made by the wireless device or some other device. Alternatively, the determination could be based on a configuration setting made when the expert proxy server was installed or when the wireless device registered with the expert proxy server.

Next, the expert proxy server identifies an application that provides the service and then communicates with the identified application that provides the service. In order to provide the service, the expert proxy server may need to engage in extensive communications with other network sites. Since this extensive communication is provided by the expert proxy server instead of by the wireless device, the bandwidth of the wireless network is not used up by such communications. Furthermore, the processing at the wireless device is not used to engage in the more extensive communications. Also, the wireless device need not store the more complex application that is used to engage in the more complex communication. Instead, the most that the wireless device did was to make a simple request for the service if such a request was made at all.

The expert proxy server compiles the results of the communication with the application and then transmits the compilation to the wireless device over the wireless network. Thus, the relatively smaller bandwidth of the wireless network is preserved by transmitting a minimal amount of information over the wireless network while leaving more extensive communications to occur over higher bandwidth external networks. Also, since the extensive processing occurs at the expert proxy server rather than at the wireless device, the application on the wireless device may be simplified and smaller as compared to the supporting applications on the expert proxy server thereby preserving the limited memory and processing capability of the wireless device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 illustrates a flowchart of a method for the expert proxy server to act as an agent on behalf of a wireless device.

DETAILED DESCRIPTION OF THE INVENTION

The present invention extends to methods, systems and data structures for using an expert proxy server as an agent for wireless devices. The expert proxy server first determines that a service is to be provided to the wireless device. The expert proxy server then identifies an application that provides the requested service and communicates with the identified application. The proxy server then compiles the results of the communication with the identified application and transmits the compilation to the wireless device.

The expert proxy server preserves the limited memory capacity of the wireless device by allowing the application and the associated data to be stored elsewhere at the expert proxy server or at another server computer system. The expert proxy server preserves the limited processing capacity of the wireless device by allowing another device to run the application. The expert proxy server also preserves the bandwidth of the wireless network by allowing the wireless device to communicate with the expert proxy server using a simple protocol. If a more complex protocol is required to communicate with the application, then the expert proxy server communicates with the application using the complex protocol rather than requiring the wireless device to communicate using the more complex protocol. In short, the expert proxy server acts as an agent of the wireless device in ways that reduce the memory, processing, and bandwidth requirements of the wireless device.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
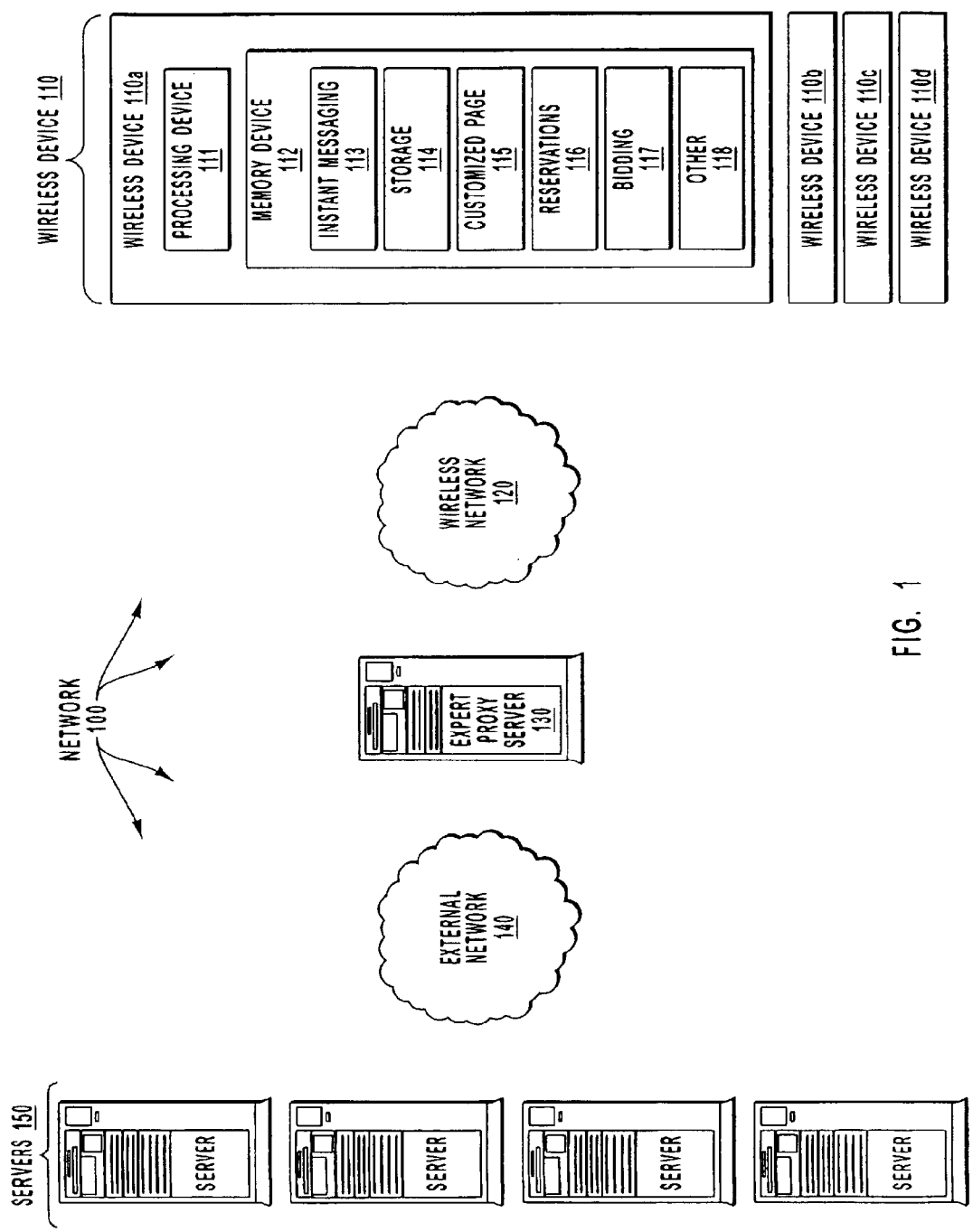
FIG. 1 illustrates a network environment in which the present invention may be implemented including an expert proxy server connected to a number of wireless devices through a wireless network and to a number of servers through an external network.

FIG. 1 illustrates a network 100 that represents a suitable operating environment for the present invention. The network 100 includes a plurality of wireless devices 110 including wireless devices 110a through 110d which communicate over a wireless network 120 with a server computer system (hereinafter, "expert proxy server") 130. It will be understood that the present invention may be readily applied using other types of "wired" devices as well. The choice of technology for communication with such wireless or wired devices ("devices") is not critical. The expert proxy server 130 may communicate over an external network 140 such as the Internet with a plurality of server computer systems 150.

Although not required, the invention will be described in the general context of computer-executable instructions, such as applications or program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

FIG. 1 shows some of the internal structure of the wireless device 110a. The wireless device 110a includes a processing device 111 and a memory device 112. The memory device 112 stores generic application or program modules 113, 114, 115, 116, 117 and 118. Each of these program modules may be a "generic" version of an application. In this description and in the claims, a "generic" version of an application means a version of an application that performs a service that includes tasks that are generally common to all applications that perform the service, the task not necessarily following the specific implementations of a specific application that provides the service. The meaning of the word "generic" will be made clearer from the following description in which several example generic applications are described.

For example, program module 113, when executed by processing device 11, supports instant messaging services. Program module 114 supports storage services. Program module 115 supports customized page services. Program module 116 supports reservations services. Program 117 supports bidding services. Although not shown, wireless devices 110b, 110c and 110d may support similar services. While the application of each of these services to the present invention is described below, those skilled in the art will recognize that the principles of the present invention may be applied to other services as well (see other services module 118).

The instant messaging services module 113 supports functionality that is generically common to generally all instant messaging systems. Such functionality might include, for example, storing presence data and creating, transmitting, receiving and presenting instant messages, and the like. The storage services module 114, customized page services module 115, reservations services module 116, bidding services module 117, and other services module 118 also support functionality that is generically common to generally all applications that provide similar services.

Figure 2:
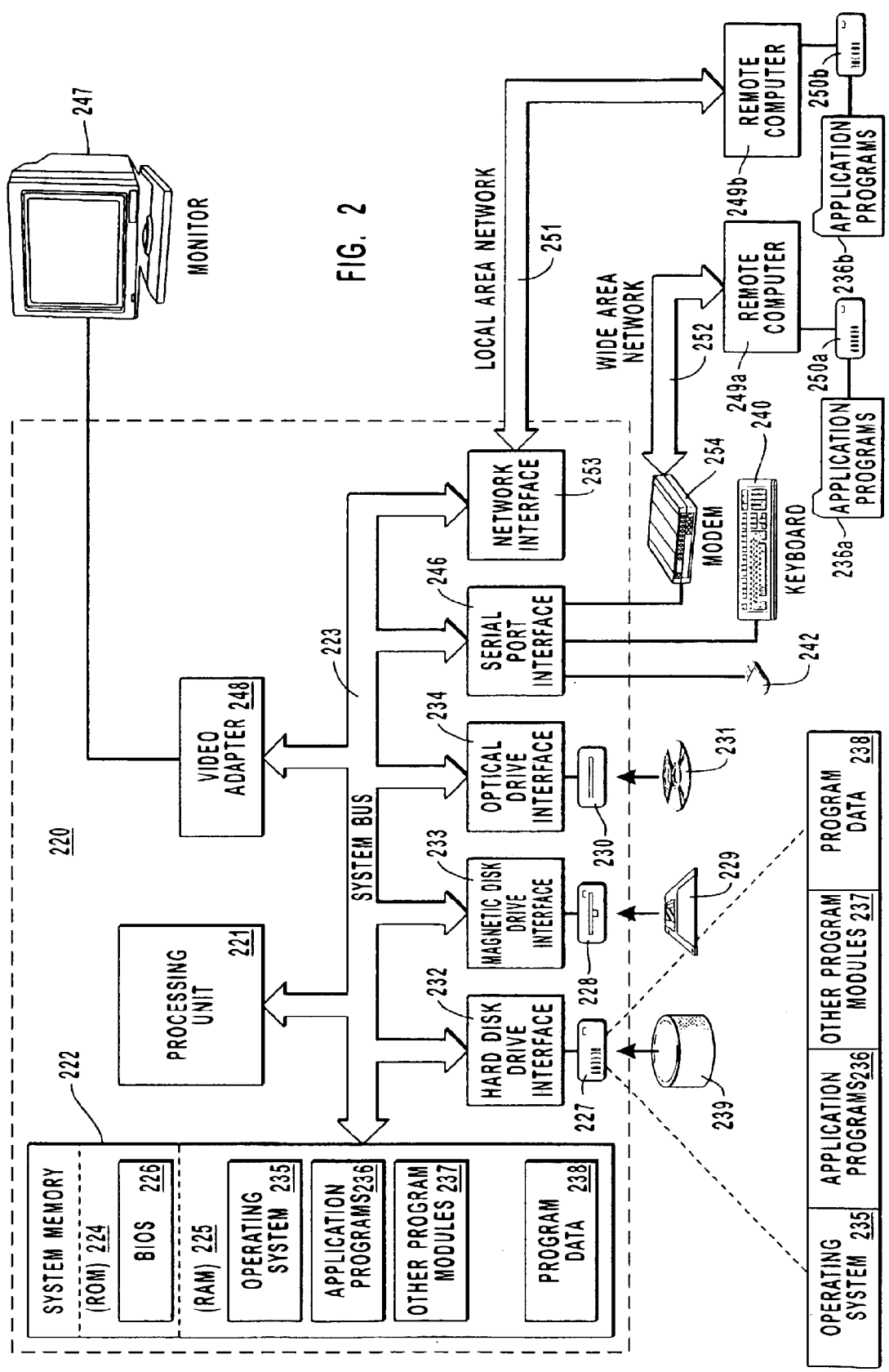
FIG. 2 illustrates at least some of the components that the expert proxy server and the other servers may include.

The expert proxy server 130 and the servers 150 may comprise or be comprised of a special purpose or general-purpose computer including various computer hardware and software. An example of a conventional general-purpose computer that may be used to implement the expert proxy server 130 or the servers 150 is illustrated as computer 220 in FIG. 2.

The conventional computer 220 includes a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 224.

The computer 220 may also include a magnetic hard disk drive 227 for reading from and writing to a magnetic hard disk 239, a magnetic disk drive 228 for reading from or writing to a removable magnetic disk 229, and/or an optical disk drive 230 for reading from or writing to removable optical disk 231 such as a CD-ROM or other optical media. The magnetic hard disk drive 227, magnetic disk drive 228, and optical disk drive 230 are connected to the system bus 223 by a hard disk drive interface 232, a magnetic disk drive-interface 233, and an optical drive interface 234, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 239, magnetic disk 229, optical disk 231, ROM 224 or RAM 225, including an operating system 235, one or more application programs 236, other program modules 237, and program data 238. If the server is to directly interface with a user, a user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 246 coupled to system bus 223. Alternatively, the input devices may be connected by other interfaces, such as a parallel port, a game port or a universal serial bus (USB). A monitor 247 or another display device is also connected to system bus 223 via an interface, such as video adapter 248. In addition to the monitor, the computer 120 may include other peripheral output devices (not shown), such as speakers and printers.

The computer 220 may operate in a networked environment using logical connections to one or more remote computers, such as remote computers 249a and 249b. Remote computers 249a and 249b may each be another personal computer, a server, a router, a network PC, a peer device or other common network node, and typically includes many or all of the elements described above relative to the computer 220, although only memory storage devices 250a and 250b and their associated application programs 236a and 236b have been illustrated in FIG. 2. The logical connections depicted in FIG. 2 include a local area network (LAN) 251 and a wide area network (WAN) 252 that are presented here by way of example and not limitation. Such networking environments are commonplace in office-wide or enterprise-wide computer networks, intranets and the Internet.

When used in a LAN networking environment, the computer 220 is connected to the local network 251 through a network interface or adapter 253. When used in a WAN networking environment, the computer 220 may include a modem 254, a wireless link, or other means for establishing communications over the wide area network 252, such as the Internet. The modem 254, which may be internal or external, is connected to the system bus 223 via the serial port interface 246.

In the example of FIG. 1, for example, communication may be established over the wireless network 120 using the wireless link. Communication over the network 140 may be by any appropriate means such as a network interface card or adapter if the network 140 is a LAN, or a modem, wireless link, or other appropriate means if the network 140 is a WAN.

In a networked environment, program modules depicted relative to the computer 220, or portions thereof, may be stored in the remote memory storage device. It will be appreciated that the network connections shown are exemplary and other means of establishing communications over wide area network 252 may be used. For example, referring to FIG. 1, some of the program modules described as being executed by the expert proxy module may be remotely stored at one or more of the servers 150.

In this description and in the claims, a "server" is defined as a computer or group of computers that provides services to another computer system. Also, a "client" is defined as a computer or group of computers that use the services of another computer system. Note that a computer system may use the services of another computer system and yet still provide services to yet another computer system. Thus, a client computer system in one context may also be a server computer system in another context. Similarly, a server computer system in one context may also be a client computer system in another context.

FIG. 3 illustrates a flowchart of a method of the expert proxy server 130 acting as an agent for the wireless device 110a so as to preserve the limited bandwidth of the wireless network and so as to preserve the limited memory and processing capacity of the wireless device 110a. The steps or acts performed by the wireless device 110a are illustrated in the right hand side of FIG. 3 under the heading "DEVICE" while steps or acts performed by the expert proxy server 130 are illustrated in the left hand side of FIG. 3 under the heading "EXPERT PROXY SERVER".

In the method of FIG. 3, the first act performed by the expert proxy server 130 is that the expert proxy server determines that a service is to be provided to a wireless device (act 320). In most cases, the user determines what services are to be provided by subscribing to the content of interest. They expert proxy server then provides the services to the device on the user's behalf. This determination may be based on a previous request for the service (act 310) made by the wireless device. However, the determination may also be based on a request from a third device such as a wired device or a server to provide the service to the wireless device. This request may have been recently made or may have been given as a default configuration setting when the expert proxy server was first set up and/or when the wireless device first registered with the expert proxy server.

After the expert proxy server determines that the service is to be provided to the wireless device, the expert proxy server performs a step for compiling a response using an application that provides the requested service (step 330). If the application is stored locally on the expert proxy server 130, the expert proxy server represents an example of a means for compiling a response using an application that provides the requested service. If the application is stored remotely on one or more of the servers 150, then the expert proxy server 130 in combination with the one or more of the server 150 represents an example of a means for compiling a response using an application that provides the requested service.

As part of the step for compiling a response using the application (step 330), the expert proxy server identifies an application that provides the requested service (act 340). Subsequently, the expert proxy server then communicates with the identified application 14 that provides the requested service (act 350). The expert proxy server then compiles the results of the communication with the application (act 360). Upon completion of the step for compiling a response using the application (step 330), the expert proxy server transmits the compilation to the wireless device over the wireless network (act 370).

Although the requested service may be any of a number of different services, the method of FIG. 3 will now be described with respect to an example service of instant messaging in which the instant messaging services module 113 is used to communicate with the expert proxy server 130. There are a wide number of different instant messaging applications that provide instant messaging services including, for example, MSN® messenger and AOL INSTANT MESSENGER℠. While different instant messenger applications have some differences to differentiate one from another, there are many services common to instant messaging that may be found in almost all, if not all, instant messaging applications. Such services include, for example, the rapid transmission and dissemination of an instant message as well as the tracking of presence information regarding potential recipients.

The wireless device stores a generic simplified version of the instant messaging application that performs tasks such as these that are common to substantially all instant messaging application. The expert proxy server takes care of communicating with the specific instant messaging application whether that instant messaging application be MSN® messenger or some other instant messaging server. Thus, the wireless device need only store the generic simplified version of an instant messaging application rather than each possible instant messenger application thus preserving the limited memory of the wireless device.

The expert proxy server determines that the instant messaging service is to be provided to the particular wireless device (act 320). In a first alternative, this determination may have been made based on the wireless device registering with the expert proxy server that instant messaging services are to be provided to the wireless device. In this alternative, the determination may be made upon receiving an indication that the wireless device is initiating an instant messaging session.

This first alternative has the advantage of not requiring any additional communication except for the original registration in making the determination thus preserving the bandwidth of the wireless network. In other words, the wireless device does not have to explicitly request the instant messaging services for every instant messaging session. Instead, the expert proxy server provides the instant messaging services automatically upon initiation of any given instant messaging session.

This first alternative is also advantageous in that if the granting of the instant messaging services is conditional, the determination of whether the conditions are satisfied may be determined up front and likely would not need to be rechecked for every instant messaging session that that wireless device engages in. This likely preserves the processing capability of both the expert proxy server and the wireless device and preserves the limited bandwidth of the wireless device.

In a second alternative, the determination that instant messaging services are to be provided to the wireless device are based on an explicit request from the wireless device made at the beginning of an instant messaging session. The request would then be honored by transmitting presence information updates to the wireless device asynchronously with requiring individual requests until the session terminates. The request would also be honored by rapidly routing instant messages to and from the wireless device. The presence information updates may be transmitted periodically, whenever any presence information changes, or according to some other time criteria. Updated presence information may also be provided synchronously in response to individual requests from the wireless device although this is often undesirable as requiring wireless network bandwidth and additional wireless device processing.

The expert proxy server performs a step for compiling a response using an application that provides the instant message service (step 330). In so doing, the expert proxy server identifies the appropriate instant messaging application that provides the instant messaging server (act 340). For example, if the destination of the instant message resides in the MSN® instant messaging network, then the expert proxy server communicates with an MSN® instant messaging application. If the destination of the instant message resides in another instant messaging network, then the expert proxy server communicates with the instant messaging application appropriate for that network. The appropriate instant messaging application may be stored in the expert proxy server itself or may be stored remotely in one of remote servers 150. The identification of the specific location of the application may be part of the act of identifying the application that provides the requested service.

Once the appropriate instant message application is identified, the expert proxy server uses conventional communication methods in communicating with the identified application (act 350). The manner in which the expert proxy server communicates with the application will depend on the application itself. If the application is an MSN® messenger application, the communication will be according to known methods of communicating with MSN® messenger applications to provide instant messaging services. If another instant messaging application, the communication may be according to methods of communicating with those instant messaging applications. Generally, these communication methods are published by software developers so as to promote communication and use of their product.

Even though the communication mechanism for communicating with these applications are conventional, they may still be quite complex. Since the expert proxy server communicates with the specific instant messaging application rather than the wireless device itself, the wireless device is spared the processing demand (and the wireless devices is spared the bandwidth demand) of having to deal directly with the identified application.

The communication with the identified instant messaging application results in one or more responses from the instant messaging application. The responses might include, for example, presence information or acknowledgement message(s) that indicate the delivery status of the instant message. The expert proxy server compiles one or more of the responses from the identified application by either including the response as received from the application or by conducting appropriate translation of the response so that the response may be interpreted by the generic application used by the wireless device. The compilation may include one or more responses from the identified application where each response is included with or without being translated.

The compilation of instant messaging information is then transmitted to the wireless device as a compilation. Thus, in cases in which multiple responses are included in the compilation, the bandwidth of the wireless network is typically preserved as compared to transmitting each response independently. Thus, the expert proxy server again preserves the bandwidth of the wireless network.

Instant messaging is but one service that the expert proxy service can provide as an agent for the wireless device.

Another is a storage service which may be generically implemented at the wireless device using the storage service module 114. To support storage services, the expert proxy server stores information for the wireless device and provides the wireless device with an identifier that identifies information. When the wireless device needs the information, the wireless devices provide the identifier to the expert proxy server. The expert proxy server then provides the identified information to the wireless device. In some cases, this might involve the expert proxy server retrieving information from remote servers 150.

In the case of storage services, the expert proxy server would determine that the storage service is to be provided, and then communicate with applications that store information. For example, the application might be the file system of the expert proxy server operating system or an in-box corresponding to the wireless device. Upon receiving an identifier of information from the wireless device, the expert proxy server would then communicate with the application (e.g., the file system) to retrieve the information. The information would then be compiled into a response and transmitted back to the wireless device. Thus, information that would otherwise have been stored at the wireless device is now stored at the expert proxy server thereby preserving the limited memory capacity of the wireless device.

Another example of an expert proxy server supported service is a customized page service which the wireless device may implement by executing the customized page service module 115. In this case, the wireless device may submit a request that asks to "show me my customized page." That is a simple request that may be represented by very little data transmitted over the wireless network. Furthermore, it takes very little processing to make such a request. Upon receiving the request, the expert proxy server handles the more complex details of communication. For example, to form the customized page information, the expert proxy server may log into a server (e.g., server 150) on behalf of the wireless device, requesting and retrieving today's calendar appointments, the most recently used contacts, and other customized information. The expert proxy server then translates the responses as needed to be in a form recognized by the wireless device. The compilation of this information is then transmitted back to the wireless device.

In the case of the customized page, the generic application at the wireless device only needed to make the request, parse the compilation, and render the information on the screen. The more complex acts of deciding what information to retrieve and where to retrieve the information from are performed by the expert proxy server. Thus, the generic version of the customization page program is relatively small which preserves wireless device memory. Furthermore, the processing at the wireless device is straightforward thus preserving the wireless device processing.

The expert proxy server could also support reservations services which may be generically implemented by the wireless device by executing the reservations services module 116. In this case, the wireless device might transmit a request such as "show me available flights from city A to city B with an approximate departure time of 3:00 pm on Monday" or perhaps "show me all my existing reservations." Again, these requests could be made over the wireless network using very little bandwidth. The expert proxy server would then determine what application might be able to fulfill the request. For example, the expert proxy server could communicate with a number of applications hosted by the airlines to determine available flights that satisfy the constraints in the request, or to determine any of the user's reservations on at that airline. This may involve extensive communication with these applications which is handled by the expert proxy server instead of by the wireless device. The results of the communications are then gathered and sent to the wireless device. The wireless device needed to only submit the request and interpret the results. The more detailed communications were handled by the agent expert proxy server.

The expert proxy server could also support bidding services which may be generically implemented by the wireless device by executing the bidding services module 117. In this case, the wireless device might transmit a request such as "let me know when any auction applications are going to auction a U.S. penny minted in 1909 bearing the marked SVDP." This was a very simple request that could be made by a simple program stored on the wireless device. The expert proxy server could then handle all the details on behalf of the wireless device. For example, the expert proxy server could communicate with a number of auction Web pages and monitor for the requested item. Once the expert proxy server receives word from one of these applications that the requested item is being auctioned, the expert proxy server would then notify the wireless device.

These applications are just examples of how the principles of the present invention may be used to have an expert proxy server act as an agent on behalf of a wireless device to reduce the memory, processing and bandwidth requirements of the wireless device. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network that includes an expert proxy server computer system that is coupled to a plurality of wireless devices through a limited bandwidth wireless network, wherein the expert proxy server is coupled through a network to a plurality of server computer systems, the expert proxy server either directly or in conjunction with the plurality of server computer systems offering a plurality of applications that provide a service, a method of the expert proxy server acting as an agent for a wireless device so as to preserve the limited bandwidth of the wireless network and so as to preserve the limited memory and processing capacity of the wireless device, the method comprising the following:

a specific act of the expert proxy server computer system determining that a service is to be provided to a wireless device, wherein said determining is other than determining whether data is stored in a local cache, the service corresponding to a generic application stored on the wireless device;

a specific act of the expert proxy server computer system identifying an application that provides the service, the application being stored remotely from both the wireless device and the expert proxy server and providing the service through specific implementations of tasks that the generic application stored on the wireless device is not capable of implementing;

a specific act of the expert proxy server computer system communicating with the identified application that provides the service, such that with only a simple request for service, the wireless device is spared having to make any further response to the expert proxy server for the service over the limited bandwidth wireless network;

a specific act of the expert proxy server computer system compiling the results of the communication with the application;

subsequent to compiling the results, translating or transcoding the communication into a generic format that can be recognized by the wireless device and that can be interpreted by the generic application; and a specific act of the expert proxy server computer system transmitting the formatted compilation to the wireless device over the limited bandwidth wireless network.

2. A method in accordance with claim 1, wherein the specific act of the expert proxy server determining that a service is to be provided to a wireless device comprises the following:

a specific act of the expert proxy server receiving a request from the wireless device to provide the service.

3. A method in accordance with claim 1, wherein the specific act of the expert proxy server computer system communicating with the identified application that provides the service comprises the following:

a specific act of the export proxy server communicating with one of the plurality of server computer systems over an external network that hosts the identified application.

4. A method in accordance with claim 1, wherein the specific act of the expert proxy server computer system communicating with the identified application that provides the service comprises the following:

a specific act of the expert proxy server submitting a plurality of separate communications to the application; and a specific act of the expert proxy server receiving a response to at least some of the plurality of communications.

5. A method in accordance with claim 1, wherein the service includes an instant messaging service.

6. A method in accordance with claim 1, wherein the service includes a storage service, and wherein the wireless device only maintains identifiers for information stored on the expert proxy server that are provided by the expert proxy server, and wireless device, and wherein the wireless device can obtain the stored information from the expert proxy server by providing one or more identifiers to the expert proxy server corresponding to the stored information.

7. A method in accordance with claim 1, wherein the service includes a customized page service, and wherein the expert proxy server compiles customized information including calendar appointments and contact information pertaining to a customized page and then translates the compiled customized information into a format recognized by the wireless device, the expert proxy server compiling the customized information in response to a simple request by the generic application for the customized page.

8. A method in accordance with claim 1, wherein the service includes a reservations service, wherein the expert proxy server identifies a plurality of applications that can provide reservations services to satisfy a simple request for a reservation made by the generic application of the wireless device, and wherein the expert proxy server gathers results from the plurality of different applications and sends the results to the wireless device.

9. A method in accordance with claim 1, wherein the service includes a bidding service, wherein the expert proxy server determines the service should be provided to the wireless device in response to a specific request from the client to be informed when a particular product is made available for sale at a particular price, and wherein the expert proxy communicates with a number of auction Web pages in response to the request, and wherein the expert proxy notifies the wireless device when the product is available at the particular price on one of the auction Web pages, as determined by monitoring the auction Web pages.

10. A computer program product comprising one or more computer-readable media having computer-executable instructions for implementing the method recited in claim 1.

11. A computer program product in accordance with claim 10, wherein the computer-executable instructions for performing the specific act of determining that a service is to be provided to a wireless device comprises computer-executable instructions for performing the following:

a specific act of receiving a request from the wireless device to provide the service.

12. A computer program product in accordance with claim 10, wherein the computer-executable instructions for performing the specific act of causing the expert proxy server computer system to communicate with the application that provides the service comprises computer-executable instructions for performing the following:

a specific act of the expert proxy server communicating with one of the plurality of server computer systems over an external network that hosts the identified application.

13. A computer program product in accordance with claim 10, wherein the computer-executable instructions for performing the specific act of causing the expert proxy server computer system to communicate with the application that provides the service comprises computer-executable instructions for performing the following:

a specific act of causing the expert proxy server to submit a plurality of separate communications to the application; and a specific act of receiving a response to at least some of the plurality of communications.

14. A computer program product in accordance with claim 10, wherein the service includes an instant messaging service.

15. A computer program product in accordance with claim 10, wherein the service includes a storage service.

16. A computer program product in accordance with claim 10, wherein the service includes a customized page service.

17. A computer program product in accordance with claim 10, wherein the service includes a reservations service.

18. A computer program product in accordance with claim 10, wherein the service includes a bidding service.

19. A method as recited in claim 1, wherein the expert proxy server communicates with the identified application and at least one over a relatively high bandwidth network as compared to the bandwidth of the wireless network.

20. A method as recited in claim 1, wherein the expert proxy server determines that the service should be provided to the wireless device without receiving a request for the service from the wireless device.

21. A method as recited in claim 1, wherein the expert proxy server determines that the service should be provided to the wireless device in response to a request from a third party.

* * * * *